United States Patent
Chan (12)

(10) Patent No.: US 9,948,912 B2
(45) Date of Patent: Apr. 17, 2018

(54) METHOD FOR PERFORMING DEPTH INFORMATION MANAGEMENT IN AN ELECTRONIC DEVICE, AND ASSOCIATED APPARATUS AND ASSOCIATED COMPUTER PROGRAM PRODUCT

(71) Applicant: MEDIATEK INC., Hsin-Chu (TW)

(72) Inventor: Cheng-Che Chan, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 218 days.

(21) Appl. No.: 14/931,866

(22) Filed: Nov. 4, 2015

(65) Prior Publication Data

US 2017/0127038 A1   May 4, 2017

(51) Int. Cl.
H04N 13/00 (2006.01)
G01B 11/22 (2006.01)
H04N 5/232 (2006.01)
H04N 5/262 (2006.01)

(52) U.S. Cl.
CPC ......... *H04N 13/0022* (2013.01); *G01B 11/22* (2013.01); *H04N 5/23229* (2013.01); *H04N 5/262* (2013.01); *H04N 13/0018* (2013.01); *H04N 13/0055* (2013.01); *H04N 13/0066* (2013.01); *H04N 2213/003* (2013.01)

(58) Field of Classification Search
CPC ........... H04N 13/0022; H04N 13/0018; H04N 13/0055; H04N 2213/003; G01B 11/22
USPC ....................................................... 382/154
See application file for complete search history.

(56) References Cited

U.S. PATENT DOCUMENTS

| 2013/0033713 A1* | 2/2013 | Patana ................... G03B 35/14 358/1.9 |
| 2013/0069934 A1* | 3/2013 | Wang ................. H04N 13/0022 345/419 |

\* cited by examiner

*Primary Examiner* — Amandeep Saini
(74) *Attorney, Agent, or Firm* — Han IP Corporation; Andy M. Han (57) ABSTRACT

A method for performing depth information management in an electronic device, an associated apparatus, and an associated computer program product are provided, where the method includes the steps of: modifying a two dimensional (2D) image, and selectively modifying a depth map of the 2D image based on modification of the 2D image before, when, or after the 2D image is modified, wherein the 2D image is retrieved from a storage module, wherein, for example, the storage module may be positioned within or outside the electronic device; and saving the modified depth map into an image file of the modified 2D image. For example, the modified depth map and the modified 2D image may correspond to each other.

20 Claims, 9 Drawing Sheets

METHOD FOR PERFORMING DEPTH INFORMATION MANAGEMENT IN AN ELECTRONIC DEVICE, AND ASSOCIATED APPARATUS AND ASSOCIATED COMPUTER PROGRAM PRODUCT

BACKGROUND

The present invention relates to image processing of a two dimensional (2D) image plus depth (e.g. for purposes of stereo picture emulation, etc.), and more particularly, to a method for performing depth information management in an electronic device, an associated apparatus, and an associated computer program product.

A conventional electronic device that is equipped with or coupled to at least one camera module, such as a conventional multifunctional mobile phone, may be designed to take a picture and to store the corresponding depth information. The conventional electronic device may be further designed to allow the end user to modify the picture (e.g. apply a special effect to the picture) to generate a resultant picture. However, some problems such as some side effects may occur. For example, according to the related art, the depth information is not modified and therefore does not match the resultant picture. Then the depth information is discarded after the special effect is applied to the picture since it does not match the resultant picture. As a result of the absence of the depth information, the conventional electronic device may be further designed to prevent the end user from applying another special effect to the resultant picture, in order to prevent an erroneous or meaningless processing result of the special effect processing. Thus, a novel method and a corresponding architecture are required to improve the performance of an electronic device that is equipped with or coupled to camera module(s).

SUMMARY

It is an objective of the claimed invention to provide a method for performing depth information management in an electronic device, an associated apparatus, and an associated computer program product, in order to solve the above-mentioned problems.

It is another objective of the claimed invention to provide a method for performing depth information management in an electronic device, an associated apparatus, and an associated computer program product, in order to improve the performance of the electronic device.

According to at least one preferred embodiment, a method for performing depth information management in an electronic device is provided, where the method comprises the steps of: modifying a two dimensional (2D) image, and selectively modifying a depth map of the 2D image based on modification of the 2D image before, when, or after the 2D image is modified, wherein the 2D image is retrieved from a storage module; and saving the modified depth map into an image file of the modified 2D image. For example, the storage module may be positioned within or outside the electronic device. According to some embodiments, the method may comprise detecting one or more depth layer groups in the depth map according to the depth information corresponding to multiple pixels of the 2D image (e.g. a portion of pixels of the 2D image, or all pixels of the 2D image), where the depth information corresponding to the multiple pixels of the 2D image is obtained from the depth map.

According to at least one preferred embodiment, an apparatus for performing depth information management in an electronic device is provided, where the apparatus comprises at least one portion of the electronic device. The apparatus may comprise a processor. For example, the processor may be positioned in the electronic device, where the processor may be arranged for controlling operations of the electronic device. For example, the processor may comprise an image processing module (e.g. a 2D image processing module) and a depth information management module. The image processing module (e.g. the 2D image processing module) is arranged for modifying a 2D image, wherein the 2D image is retrieved from a storage module. For example, the storage module may be positioned within or outside the electronic device. In addition, the depth information management module is arranged for selectively modifying a depth map of the 2D image based on modification of the 2D image before, when, or after the 2D image is modified, wherein the processor saves the modified depth map into an image file of the modified 2D image. According to some embodiments, the depth information management module may detect one or more depth layer groups in the depth map according to the depth information corresponding to multiple pixels of the 2D image (e.g. a portion of pixels of the 2D image, or all pixels of the 2D image), where the depth information corresponding to the multiple pixels of the 2D image is obtained from the depth map.

According to at least one preferred embodiment, a computer program product is provided, where the computer program product has program instructions for instructing a processor of an electronic device to perform a method comprising the steps of: modifying a 2D image, and selectively modifying a depth map of the 2D image based on modification of the 2D image before, when, or after the 2D image is modified, wherein the 2D image is retrieved from a storage module, such as a storage module positioned within the electronic device or a storage module positioned outside the electronic device; and saving the modified depth map into an image file of the modified 2D image.

It is an advantage of the present invention that the present invention method, the associated apparatus, and the associated computer program product can improve the overall performance of the electronic device with fewer side effects. In addition, the present invention method, the associated apparatus, and the electronic device operating according to the associated computer program product can modify at least one portion of the depth map and save the modified depth map, to allow the end user to further modify the modified 2D image (e.g. apply one or more special effects to the modified 2D image), in order to prevent the related art problems. Therefore, in comparison with the related art, the present invention method, the associated apparatus, and the associated computer program product can bring better user experience.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
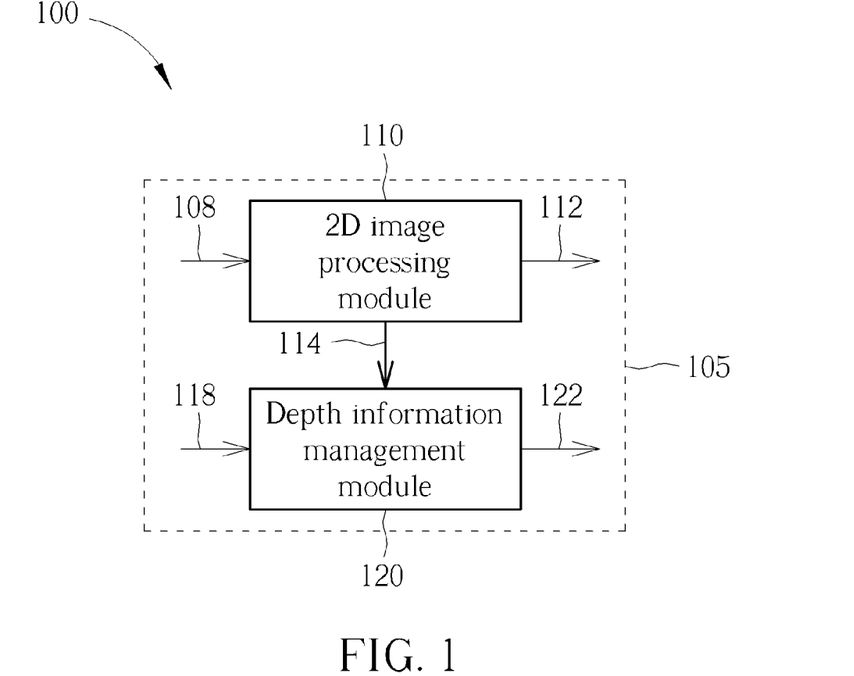
FIG. 1 is a diagram of an apparatus for performing depth information management in an electronic device according to a first embodiment of the present invention.

FIG. 1 illustrates a diagram of an apparatus 100 for performing depth information management in an electronic device according to a first embodiment of the present invention, where the apparatus 100 comprises at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a mobile phone (e.g. a multifunctional mobile phone), a tablet, a wearable device, and a personal computer such as a laptop computer.

As shown in FIG. 1, the apparatus 100 may comprise a processor 105. In one example, the processor 105 may be positioned in the electronic device. In another example, the processor 105 may be arranged for controlling operations of the electronic device. The processor 105 may comprise an image processing module such as a two dimensional (2D) image processing module 110, and may further comprise a depth information management module 120. For example, each of the 2D image processing module 110 and the depth information management module 120 can be implemented by at least one program module (e.g. one or more program modules) running on the processor 105. This is for illustrative purposes only, and is not meant to be a limitation of the present invention. According to some embodiments of the present invention, at least one module (e.g. one or more modules) within the 2D image processing module 110 and the depth information management module 120 can be implemented by hardware circuits. According to this embodiment, the 2D image processing module 110 may be arranged for modifying a 2D image (e.g. perform 2D image processing). The 2D image may be retrieved from a storage module. The depth information management module 120 may be arranged for selectively modifying a depth map of the 2D image based on modification of the 2D image before, when, or after the 2D image is modified. The processor 105 may save the modified depth map into an image file of the modified 2D image. The 2D image processing module 110 may send image modification information 114 of 2D image processing to the depth information management module 120, and the depth information management module 120 may perform depth information management according to the image modification information 114.

Figure 2:
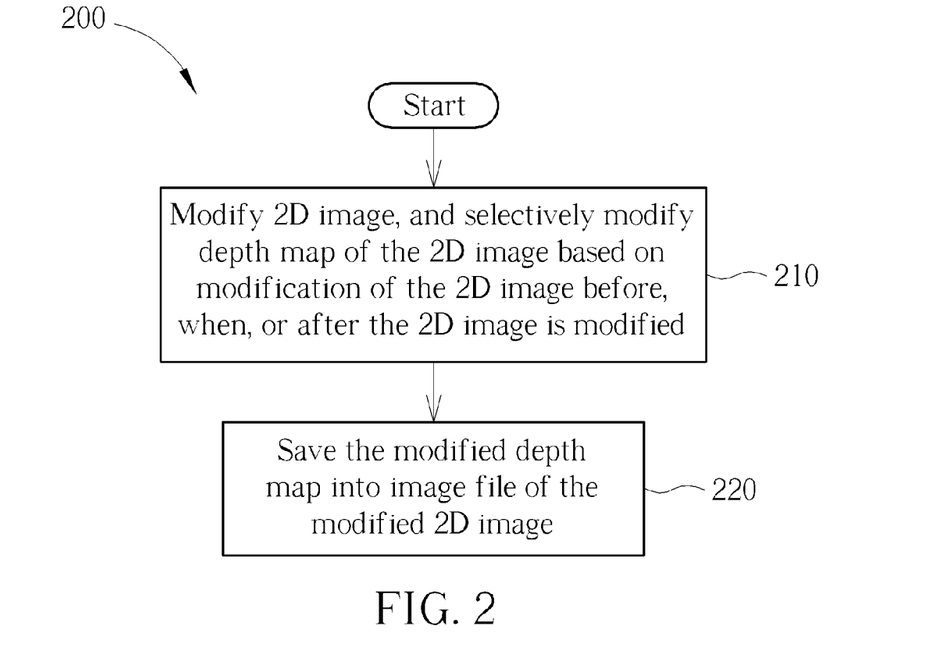
FIG. 2 illustrates a flowchart of a method for performing depth information management in an electronic device according to an embodiment of the present invention.

FIG. 2 illustrates a flowchart of a method 200 for performing depth information management in an electronic device according to an embodiment of the present invention. The method 200 shown in FIG. 2 can be applied to the apparatus 100 shown in FIG. 1, and can be applied to the processor 105 thereof and some program modules running on the processor 105 (e.g. the 2D image processing module 110 and the depth information management module 120). For example, the program modules may be provided through a computer program product having program instructions for instructing the processor 105 to perform the method 200 shown in FIG. 2, where the computer program product may be implemented as a non-transitory computer-readable medium (e.g. a floppy disk or a compact disc-read only memory (CD-ROM)) storing the program instructions or an equivalent version thereof, such as a software package for being installed. This is for illustrative purposes only, and is not meant to be a limitation of the present invention. The method can be described as follows.

In Step 210, the processor 105 may modify a 2D image 108, and may selectively modify a depth map 118 of the 2D image 108 based on modification of the 2D image before, when, or after the 2D image 108 is modified, where the 2D image 108 can be retrieved from a storage module (e.g. a storage module internal to or external to the electronic device). The storage module can be a volatile memory (e.g. a random access memory (RAM)), a non-volatile memory (e.g. a Flash memory) or a hard disk drive (HDD). For example, the processor 105 may utilize the 2D image processing module 110 running thereon to modify the 2D image 108, and the processor 105 may utilize the depth information management module 120 running thereon to modify the depth map 118 of the 2D image 108 before, when, or after the 2D image 108 is modified.

As a result of modifying the 2D image 108, the 2D image processing module 110 may generate the modified 2D image 112. In addition, as a result of modifying the depth map 118, the depth information management module 120 may generate the modified depth map 122. According to this embodiment, the modified depth map 122 and the modified 2D image 112 may correspond to each other, where the modification(s) applied to the 2D image 108 and the modification(s) applied to the depth map 118 may correspond to each other. Examples of the modification(s) applied to the 2D image 108 may include, but not limited to, some image processing operations (or special effects) such as replacing the background of the 2D image 108, extracting an object from the 2D image 108, adding an object onto the background of the 2D image 108, blurring the background of the 2D image 108, blurring the foreground of the 2D image 108, and refocusing the 2D image 108.

In Step 220, the processor 105 may save the modified depth map 122 into an image file of the modified 2D image 112. For example, the image file of the modified 2D image 112 can be a file that is different from the original image file of the 2D image 108. In another example, the image file of the modified 2D image 112 and the original image file of the 2D image 108 can be the same file, where the processor 105 may update this file.

According to this embodiment, instead of simply discarding all of the information of the depth map 118 (e.g. the depth information corresponding to all pixels of the 2D image 108), 2D the processor 105 does not discard the whole of the depth map 118. This is for illustrative purposes only, and is not meant to be a limitation of the present invention. The modified depth map 122 may contain none, a portion, or the whole of the information obtained from the depth map 118. As a result of saving the modified depth map 122 into the image file of the modified 2D image 112, the latest depth information (e.g. the modified depth map 122) of the modified 2D image 112 surely exists. Therefore, when needed, the processor 105 may perform one or more of the aforementioned image processing operations (or special effects) again and again. For example, in a situation where the image file mentioned in Step 220 is stored in a storage module, the processor 105 may perform one or more of the aforementioned image processing operations (or special effects) on the modified 2D image 112 retrieved from the storage module, according to the modified depth map 122 retrieved from the storage module.

According to some embodiments, the depth information management module 120 may detect one or more depth layer groups in the depth map 118 according to the depth information corresponding to multiple pixels of the 2D image 108 (e.g. a portion of pixels of the 2D image 108, or all pixels of the 2D image 108), where the depth information corresponding to the multiple pixels of the 2D image is obtained from the depth map 118. For example, based on some statistics data of the depth map 118 (e.g. a histogram of the depth map 118), the depth information management module 120 may determine whether a set of depth data in the depth map 118 belongs to a depth layer group. According to one embodiment, the depth information management module 120 may determine that the set of depth data belongs to the same depth layer group when the set of depth data are close to each other along the depth axis. For example, when the set of depth data falls within the range of a small interval along the depth axis (e.g. an interval which is much smaller than that of all possible depth values along the depth axis), the depth information management module 120 may determine that the set of depth data belongs to the same depth layer group. In some of these embodiments, the depth information management module 120 may check whether the set of depth data corresponds to an object (which may comprise a set of pixels within the aforementioned all pixels of the 2D image 108), to determine whether the set of depth data exactly belongs to the same depth layer group. For example, the depth information management module 120 may obtain the boundary of the object and retrieve the depth data corresponding to the object from the depth map 118 according to the boundary of the object, where the retrieved depth data can be regarded as the set of depth data that belongs to the same depth layer group. 2D This is for illustrative purposes only, and is not meant to be a limitation of the present invention.

According to some embodiments, the depth information management module 120 may perform depth normalization on the aforementioned depth layer group(s) in the depth map 118 (i.e. the aforementioned one or more depth layer groups). For example, the depth information management module 120 may alter the set of depth data to become the same depth, which means the set of pixels corresponds to the same depth, in order to make (or to increase) a depth gap between the depth layer group and another depth layer group, or between the depth layer group and a depth layer. According to some embodiments, the depth information management module 120 may perform layer extension on at least one portion (e.g. a portion or all) of the depth layer group(s) in the depth map 118, to shift (or move) the depth layer group(s) along the depth axis. As a result of performing the layer extension, the depth information management module 120 may extend the depth gap between the depth layer group and another depth layer group, or between the depth layer group and a depth layer along the depth axis. The above operations are for illustrative purposes only, and are not meant to be limitation(s) of the present invention. In some cases, such as a depth gap does not need to be increased or extended, it is unnecessary to perform the aforementioned depth normalization and/or layer extension.

As mentioned, the depth information management module 120 may perform layer extension on at least one portion (e.g. a portion or all) of the depth layer group(s) in the depth map 118, to shift (or move) the depth layer group(s) along the depth axis. This is for illustrative purposes only, and is not meant to be a limitation of the present invention. According to some embodiments, the depth information management module 120 may perform layer extension on at least one portion (e.g. a portion or all) of a plurality of depth layers of the same depth layer group in the depth map 118, such as a specific depth layer group of the aforementioned depth layer group(s). For example, the depth information management module 120 may perform layer extension on a certain depth layer within the plurality of depth layers. In some examples, the depth information management module 120 may perform layer extension on a portion of depth layers within the plurality of depth layers. In some examples, the depth information management module 120 may perform layer extension on all depth layers within the plurality of depth layers. As a result of performing the layer extension, the depth information management module 120 may extend the depth gap between one depth layer and another depth layer within a depth layer group such as the specific depth layer group mentioned above, or between a depth layer of one depth layer group and a depth layer of another depth layer group along the depth axis. Please note that, when performing layer extension on a depth layer (e.g. the aforementioned certain depth layer within the plurality of depth layers, any depth layer of the aforementioned portion of depth layers within the plurality of depth layers, or any depth layer of the aforementioned all depth layers within the plurality of depth layers), the depth information management module 120 may shift all of the objects in the whole of this depth layer, rather than merely shifting a certain object within these objects.

According to some embodiments, the depth information management module 120 may insert new object depth information into the depth map 118, to generate the modified depth map 122. For example, the 2D image processing module 110 may insert at least one new object (e.g. one or more new objects) into the 2D image 108 to generate the modified 2D image 112, and the depth information management module 120 may correspondingly generate the new object depth information according to the image modification information 114, where the new object depth information may represent the depth information of the aforementioned at least one new object in the modified 2D image 112.

Two or more of the above-mentioned operations on the depth map, such as detecting one or more depth layer groups, performing depth normalization on the depth layer group(s), performing layer extension on the depth layer group(s) and inserting new object depth information, can be combined in different manners according to different design requirements, respectively. In some embodiments, the gap between depth layers, between depth layer groups or between a depth layer and a depth layer group may not be large enough to accommodate the new object. Therefore depth normalization and/or layer extension may be performed to increase and/or extend the depth gap so that the new object insertion can be completed. For example, the depth information management module 120 may first detect the depth layer group(s), perform the depth normalization on the depth layer group(s), and then insert the new object depth information into the depth map 118 to generate the modified depth map. In another example, the depth information management module 120 may first detect the depth layer group(s), perform the layer extension on the depth layer group(s), and then insert the new object depth information into the depth map 118 to generate the modified depth map. In still another example, the depth information management module 120 may first detect the depth layer group(s) in the depth map 118, and then perform the depth normalization and layer extension on the depth layer group(s). Afterward, the depth information management module 120 may insert the new object depth information into the depth map 118 to generate the modified depth map. This is for illustrative purposes only, and is not meant to be a limitation of the present invention.

Figure 3:
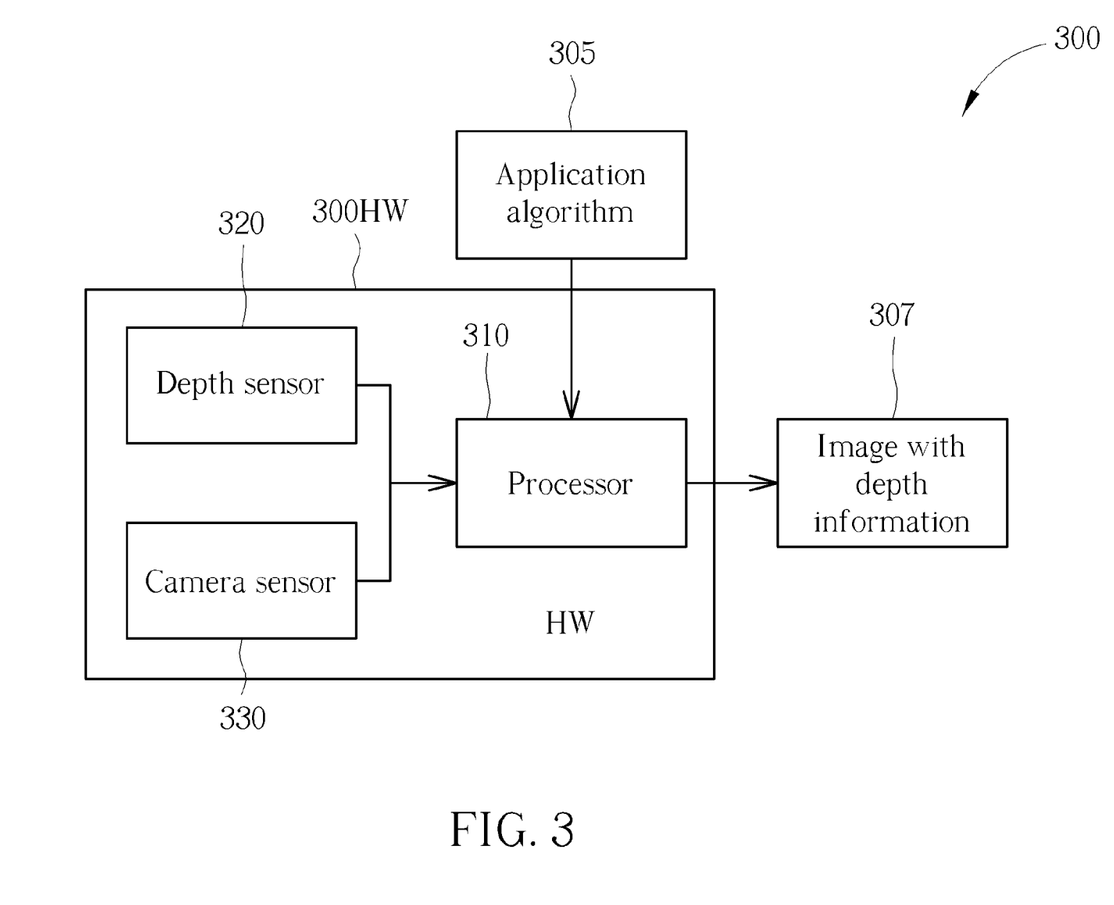
FIG. 3 illustrates some implementation details involved with the method shown in FIG. 2 according to an embodiment of the present invention.

FIG. 3 illustrates some implementation details involved with the method 200 shown in FIG. 2 according to an embodiment of the present invention. The architecture 300 may comprise one or more hardware circuits, which can be referred to as the hardware circuit 300HW (labeled "HW" in FIG. 3, for brevity). The hardware circuit 300HW may comprise a processor 310, a depth sensor 320, and a camera sensor 330. Please note that the architecture 300 shown in FIG. 3 can be taken as an example of the electronic device mentioned in the embodiment shown in FIG. 1.

According to this embodiment, the processor 310 may retrieve some program instructions of a set of application algorithms 305 and may perform operations regarding depth information management, such as that of the method 200 (e.g. the operation of Step 210 and the operation of Step 220). The processor 310 may generate the resultant image 307 according to the program instructions. The resultant image 307 may comprise the image data of the modified 2D image 112 and the depth data of the modified depth map 122, and therefore can be labeled "Image with depth information" in FIG. 3, for better comprehension. Thus, the processor 310 can be taken as an example of the processor 105, and the program instructions of the set of application algorithms 305 can be taken as an example of the aforementioned at least one program module.

In one example, the camera sensor 330 may be positioned in the electronic device (e.g. positioned in a camera module of the electronic device) and coupled to the processor 310. A camera module may comprise a lens and some associated mechanical components for supporting the lens and aligning the optical axis of the lens to the center of the sensing area of the camera sensor 330. For example, the camera sensor 330 may be arranged for generating the image data of the 2D image 108, where the processor 310 may store the image data of the 2D image 108 in a storage module before the operation of Step 210 is performed. Additionally, the depth sensor 320 may be coupled to the processor 310. For example, the depth sensor 320 may be arranged for generating the depth information of the depth map 118 when the camera sensor 330 generates the image data of the 2D image 108. This is for illustrative purposes only, and is not meant to be a limitation of the present invention. In some examples, the camera sensor 330 may be positioned outside the electronic device (e.g. positioned in a camera module coupled to the electronic device). In some examples, the depth sensor 320 may be positioned within or outside the electronic device. In some examples, the coupling between the camera sensor 330 and the processor 310 and/or the coupling between the depth sensor 320 and the processor 310 may be direct or indirect. Examples of indirect coupling may comprise that, the data generated by a sensor (e.g. the depth sensor 320, or the camera sensor 330) is stored in the storage module, and then the processor 310 may read the data from the storage module; and that, the data generated by a sensor (e.g. the depth sensor 320, or the camera sensor 330) is stored in a storage module A, and a certain component moves the data from the storage module A to a storage module B, and then the processor 310 may read the data from the storage module B.

Regarding the depth sensor 320 and the operations thereof, some conventional solutions are proposed in the related art, and there are some existing products that can be utilized as the depth sensor 320. Therefore, implementation details of the depth sensor 320 are not repeated in detail here.

Figure 4:
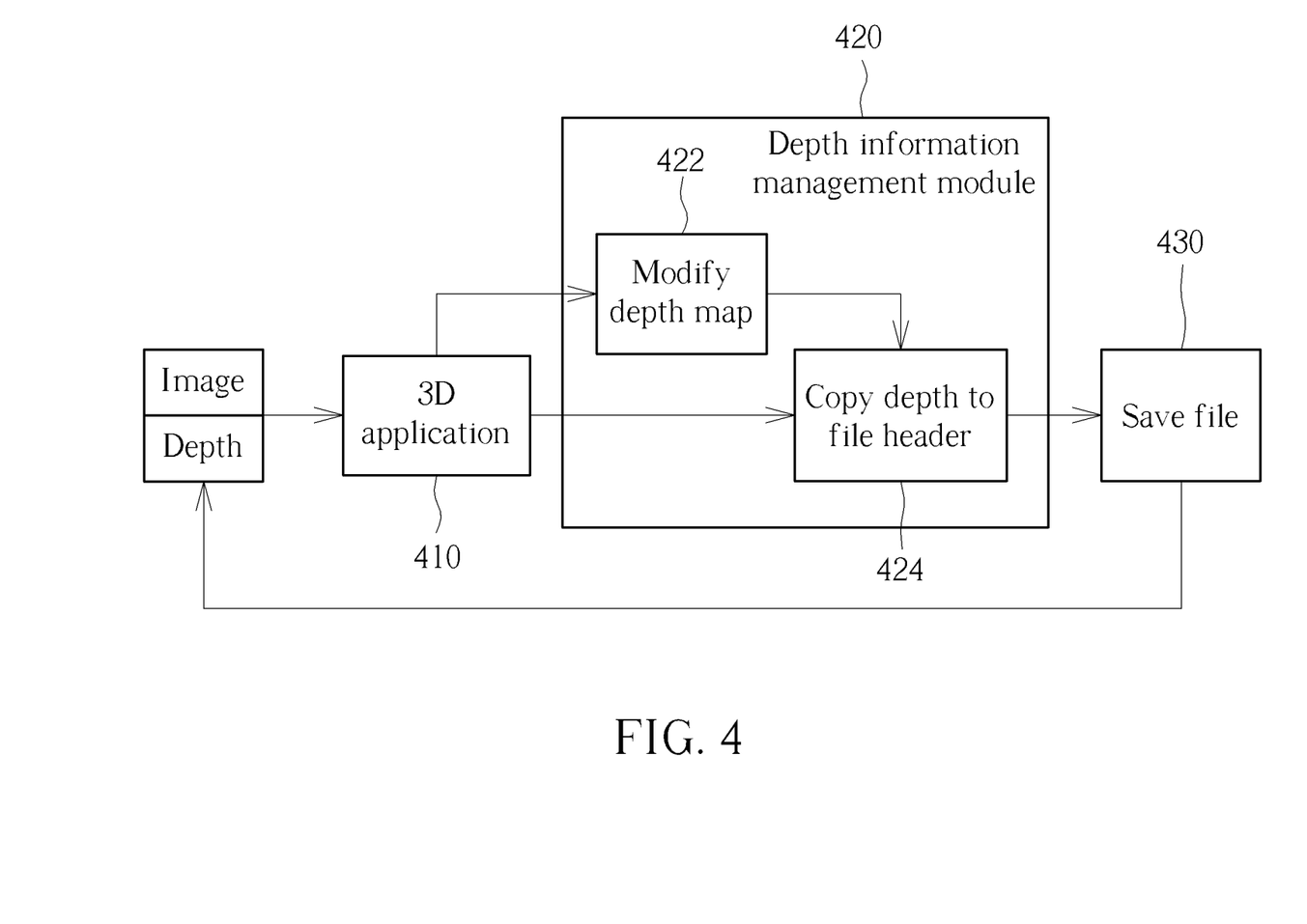
FIG. 4 illustrates a control scheme involved with the method shown in FIG. 2 according to an embodiment of the present invention.

FIG. 4 illustrates a control scheme involved with the method 200 shown in FIG. 2 according to an embodiment of the present invention. The 3D application 410 can be taken as an example of the 2D image processing module 110, and the depth information management module 420 can be taken as an example of the depth information management module 120. Examples of the modification(s) that the 3D application 410 applied to the 2D image 108 may include, but not limited to, some image processing operations (or special effects) such as replacing the background of the 2D image 108, extracting an object from the 2D image 108, adding an object onto the background of the 2D image 108, blurring the background of the 2D image 108, blurring the foreground of the 2D image 108, and refocusing the 2D image 108.

According to this embodiment, the image file of the modified 2D image 112 and the original image file of the 2D image 108 can be the same file, where the processor 105 may update this file. Thus, before modification, this file may comprise a current version of the 2D image 108 and a current version of the depth map 118 (respectively labeled "Image" and "Depth" around the leftmost of FIG. 4, for brevity). The 3D application 410 may receive the current version of the 2D image 108 and the current version of the depth map 118, and may modify the current version of the 2D image 108 to generate a current version of the modified 2D image 112, and may further input both of the current version of the modified 2D image 112 and the current version of the depth map 118 into the depth information management module 420. In addition, the depth information management module 420 may perform one or more depth map modification operations 422 (labeled "Modify depth map" in FIG. 4, for better comprehension) on the current version of the depth map 118 to generate a current version of the modified depth map 122, and may perform a file header preparation operation 424 (labeled "Copy depth to file header" in FIG. 4, for better comprehension) to prepare a current version of the file header of this file by copying the current version of the modified depth map 122 into the file header. Additionally, the processor 310 may execute a save file command 430 to save the current version of the file header and the current version of the modified 2D image 112 into this file. As a result, the processor 310 may update this file with the current version of the modified 2D image 112 and the current version of the modified depth map 122, which can be regarded as the latest version of the 2D image 108 and the latest version of the depth map 108, respectively. For brevity, similar descriptions for this embodiment are not repeated in detail here.

According to some embodiments, the timing of modifying the 2D image 108 mentioned in Step 210 and the timing of modifying the depth map 118 mentioned in Step 210 may vary. In one embodiment, the processor 105 may modify the depth map 118 before the 2D image 108 is modified. For example, when the processor 105 is notified of (e.g. from a user selection) that the user intend to insert an object, the processor 105 may perform depth normalization first. As a result, the processor 105 modifies the depth map 118 before the 2D image 108 is modified. This is for illustrative purposes only, and is not meant to be a limitation of the present invention. In another embodiment, the processor 105 may modify the depth map 118 when the 2D image 108 is modified. In yet another embodiment, the processor 105 may modify the depth map 118 after the 2D image 108 is modified.

According to some embodiments, the depth map 118 may be carried by or positioned in a file header such as that mentioned above. This is for illustrative purposes only, and is not meant to be a limitation of the present invention. In some embodiments, the depth map 118 may be combined with the 2D image 108 in another form to generate a single file.

According to some embodiments, such as that shown in FIG. 4, the processor 105 may update the image file. This is for illustrative purposes only, and is not meant to be a limitation of the present invention. In some embodiments, the processor 105 may save the modified results (e.g. the modified 2D image 112 and the modified depth map 122) as another file.

Figure 5:
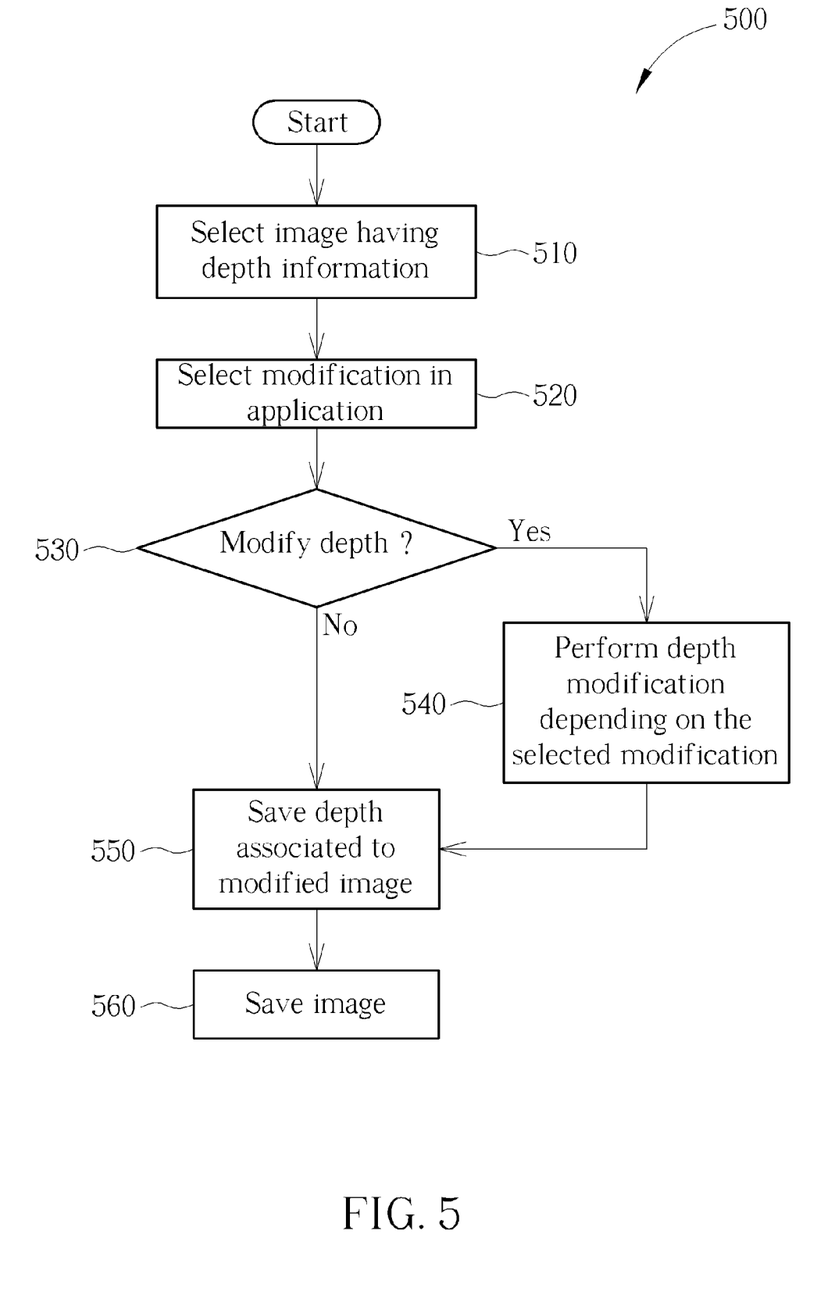
FIG. 5 illustrates a working flow involved with the method shown in FIG. 2 according to an embodiment of the present invention.

FIG. 5 illustrates a working flow 500 involved with the method 200 shown in FIG. 2 according to an embodiment of the present invention. The working flow 500 can be applied to the apparatus 100 shown in FIG. 1 and/or the architecture 300 shown in FIG. 3.

In Step 510, the processor 105 may select an image having depth information, such as the 2D image 108 mentioned in Step 210, where the image file storing the 2D image 108 may also store the depth map 118 associated to the 2D image 108.

In Step 520, the processor 105 may select modification (e.g. a command icon named or labeled "Modify" for being selected by the user through a user interface (UI) of the electronic device, or one of a series of command icons corresponding to various types of modifications for being selected by the user through the UI) in an application such as the 3D application 410, for modifying the image mentioned in Step 510 by performing image processing on this image to generate a modified image. Please note that, although the name of the 3D application 410 may indicate that the 3D application 410 has the so-called "3D" functionality, the 3D application 410 may be arranged for processing the aforementioned current version of the 2D image 108 (labeled "Image" around the leftmost of FIG. 4, for brevity) while the depth information management module 420 may be arranged for processing the aforementioned current version of the depth map 118 (labeled "Depth" around the leftmost of FIG. 4, for brevity), where the 3D application 410 may selectively trigger some operations of the depth information management module 420. Thus, the 3D application 410 can indeed be taken as an example of the 2D image processing module 110. For example, the selected modification (e.g. the command icon labeled "Modify") may be associated to the aforementioned modification(s) of the embodiment shown in FIG. 2.

In Step 530, the processor 105 may determine whether to modify the depth information mentioned in Step 510 (labeled "Modify depth?" in FIG. 5, for brevity). For example, the processor 105 may determine whether to modify the depth information according to whether the modification selected in Step 520 belongs to a first group of modifications or a second group of modifications within a plurality of predetermined modifications such as the various types of modifications. More particularly, the processor 105 may determine to modify the depth information in a situation where the modification selected in Step 520 belongs to the first group of modifications, or may determine to prevent modifying the depth information in a situation where the modification selected in Step 520 belongs to the second group of modifications. Examples of the first group of modifications may include, but not limited to, refocusing, and adding an object. Examples of the second group of modifications may include, but not limited to, changing background color. This is for illustrative purposes only, and is not meant to be a limitation of the present invention. As shown in FIG. 5, when it is determined to modify the depth information, Step 540 is entered; otherwise, Step 550 is entered.

In Step 540, the processor 105 (e.g. the depth information management module 120 running thereon) may perform depth modification depending on the selected modification, such as one or more depth modification operations depending on the modification selected in Step 520, to generate the modified depth map 122. For example, the aforementioned one or more operations of depth modification depending on the application may comprise the operation of Step 210. In a situation where the operation of Step 540 is performed, the operations of the working flow 500 can be taken as an example of that of the method 200. Examples of the depth modification mentioned in Step 540 may include, but not limited to, creating new object information, performing the aforementioned depth normalization, performing the aforementioned layer extension.

In Step 550, the processor 105 (e.g. the depth information management module 120 running thereon) may save the latest depth map associated to the modified image (labeled "Save depth associated to modified image" in FIG. 5, for brevity), no matter whether the operation of Step 540 is performed. For example, the processor 105 may prepare the file header of the modified image, and may save the latest depth map into this file header. When the operation of Step 540 is performed, the latest depth map may represent the modified depth map 122; otherwise, the latest depth map may represent the depth map 118.

In Step 560, the processor 105 may save the modified image, together with the file header thereof, into a file (labeled "Save image" in FIG. 5, for brevity). This file can be taken as an example of the image file mentioned in Step 220.

It should be noted that, according to different embodiments, the working flow 500 may be performed in an order different from the order shown in FIG. 5, one or more steps may be added to the working flow 500, and/or one or more steps may be omitted from the working flow 500. For example, Step 550 may be omitted if step 540 is not performed.

Figure 6:
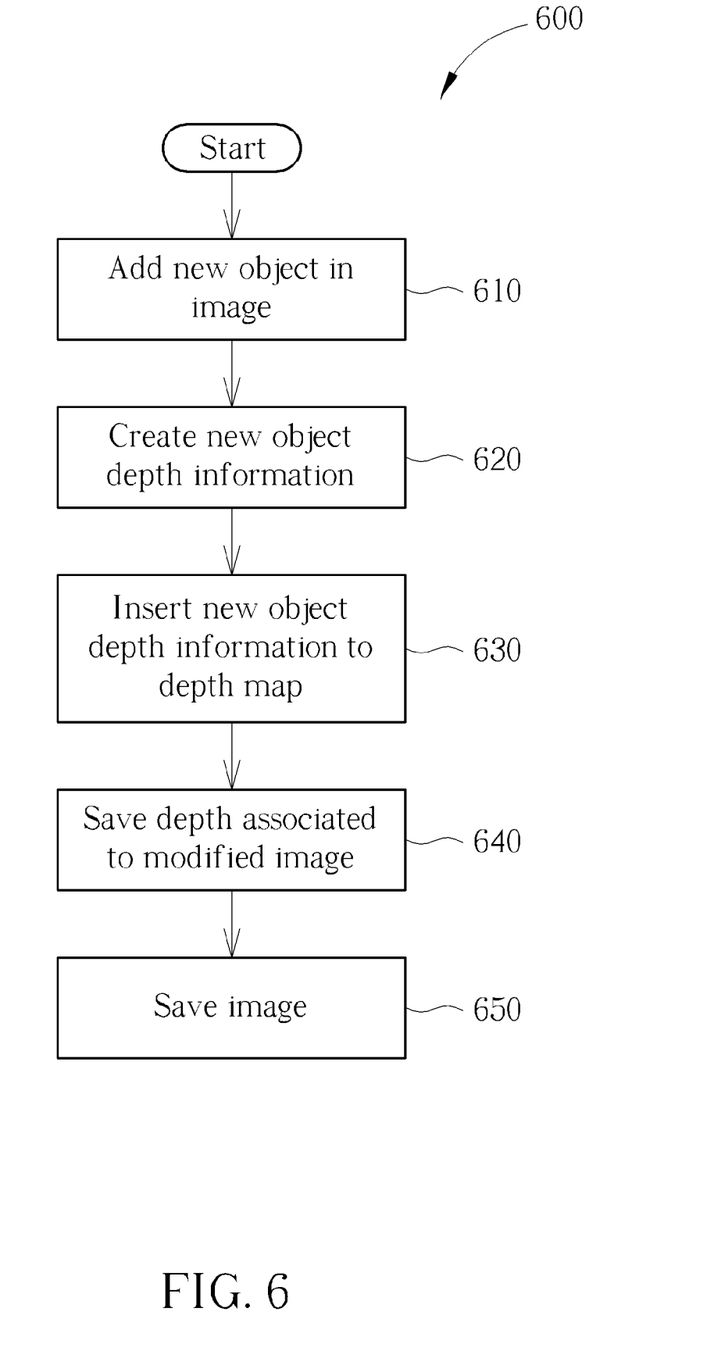
FIG. 6 illustrates a working flow involved with the method shown in FIG. 2 according to another embodiment of the present invention.

FIG. 6 illustrates a working flow 600 involved with the method 200 shown in FIG. 2 according to another embodiment of the present invention. The working flow 600 can be applied to the apparatus 100 shown in FIG. 1 and/or the architecture 300 shown in FIG. 3.

In Step 610, the processor 105 (e.g. the 2D image processing module 110 running thereon) may add a new object in an image such as the 2D image 108 mentioned in Step 210, for generating a modified image such as the modified 2D image 112. This new object can be taken as an example of the aforementioned at least one new object in the modified 2D image 112.

In Step 620, the processor 105 (e.g. the depth information management module 120 running thereon) may create new object depth information, i.e. the depth information of this new object.

In Step 630, the processor 105 (e.g. the depth information management module 120 running thereon) may insert the new object depth information mentioned in Step 620 to the depth map of the image mentioned in Step 610, such as the depth map 118, to generate the modified depth map 122.

In Step 640, the processor 105 (e.g. the depth information management module 120 running thereon) may save the latest depth map associated to the modified image (labeled "Save depth associated to modified image" in FIG. 6, for brevity). For example, the processor 105 may prepare the file header of the modified image, and may save the latest depth map into this file header, where the latest depth map may represent the modified depth map 122.

In Step 650, the processor 105 may save the modified image, together with the file header thereof, into a file (labeled "Save image" in FIG. 6, for brevity). This file can be taken as an example of the image file mentioned in Step 220.

It should be noted that, according to different embodiments, the working flow 600 may be performed in an order different from the order shown in FIG. 6, one or more steps may be added to the working flow 600, and/or one or more steps may be omitted from the working flow 600.

Figure 7:
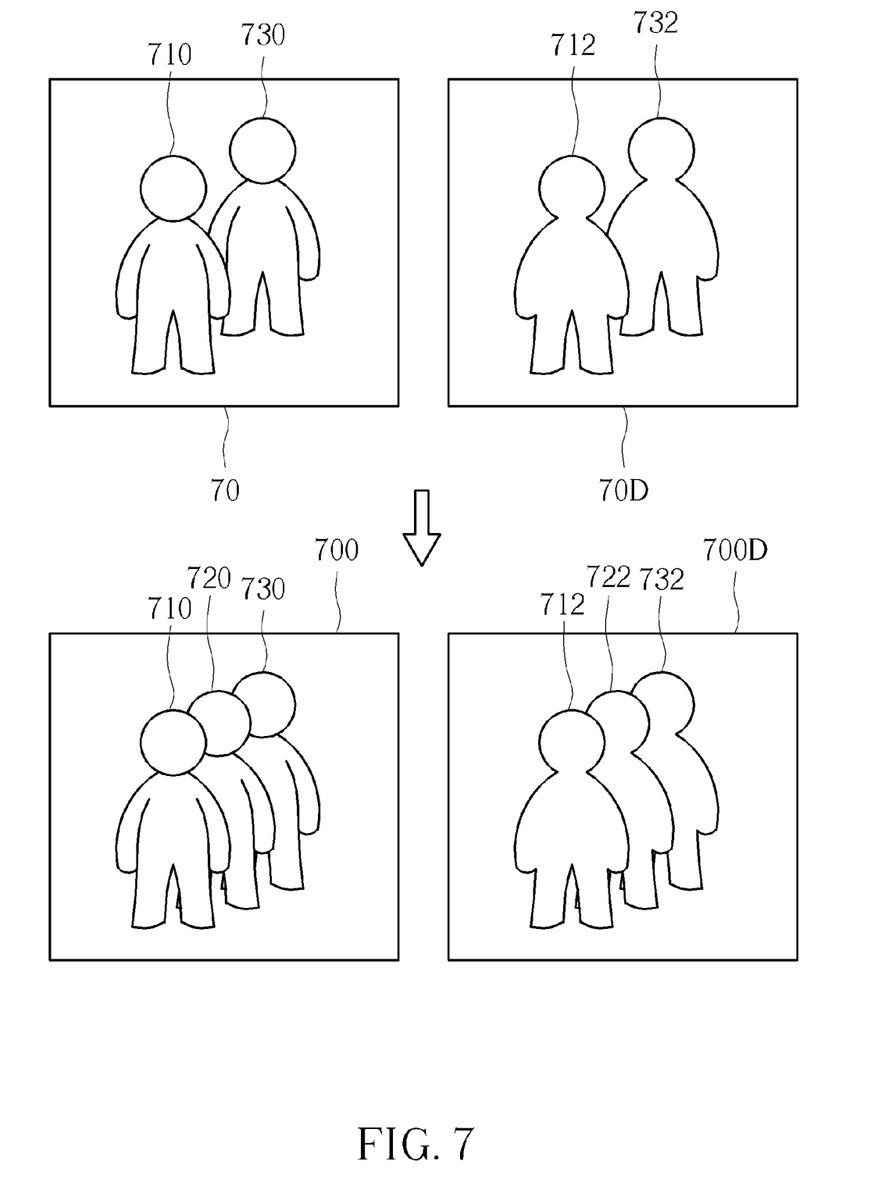
FIG. 7 illustrates new object depth information involved with the method shown in FIG. 2 according to an embodiment of the present invention.

FIG. 7 illustrates new object depth information 722 involved with the method 200 shown in FIG. 2 according to an embodiment of the present invention. The 2D image 70 and the depth map 70D can be taken as examples of the 2D image 108 and the depth map 118, respectively. In addition, the modified 2D image 700 and the modified depth map 700D can be taken as examples of the modified 2D image 112 and the modified depth map 122, respectively.

According to this embodiment, the 2D image 70 may comprise two objects 710 and 730 (e.g. two persons), and the depth map 70D may comprise the original depth information 712 and 732 respectively corresponding to the two objects 710 and 730. After the operation of Step 210 is performed, the modified 2D image 700 may comprise the original two objects 710 and 730, and may further comprise a new object 720 (e.g. another person, whose image may be cropped and copied from another image). In addition, the modified depth map 700D may comprise the original depth information 712 and 732, and may further comprise the new object depth information 722 corresponding to the new object 720.

In one example, the objects 710 and 730 may be close to each other, and the depth gap between the depth layer group of the original depth information 712 (e.g. the depth distribution of the original depth information 712) and the depth layer group of the original depth information 732 (e.g. the depth distribution of the original depth information 732) along the depth axis may not be large enough to allow the new object depth information 722 to be inserted. Therefore, to increase the depth gap, the depth information management module 120 may perform the aforementioned depth normalization and/or layer extension on at least one of the depth layer group of the original depth information 712 and the depth layer group of the original depth information 732 in the depth map 70D first. Then the new object depth information 722 corresponding to the new object 720 can be inserted. For brevity, similar descriptions for this embodiment are not repeated in detail here.

Figure 8:
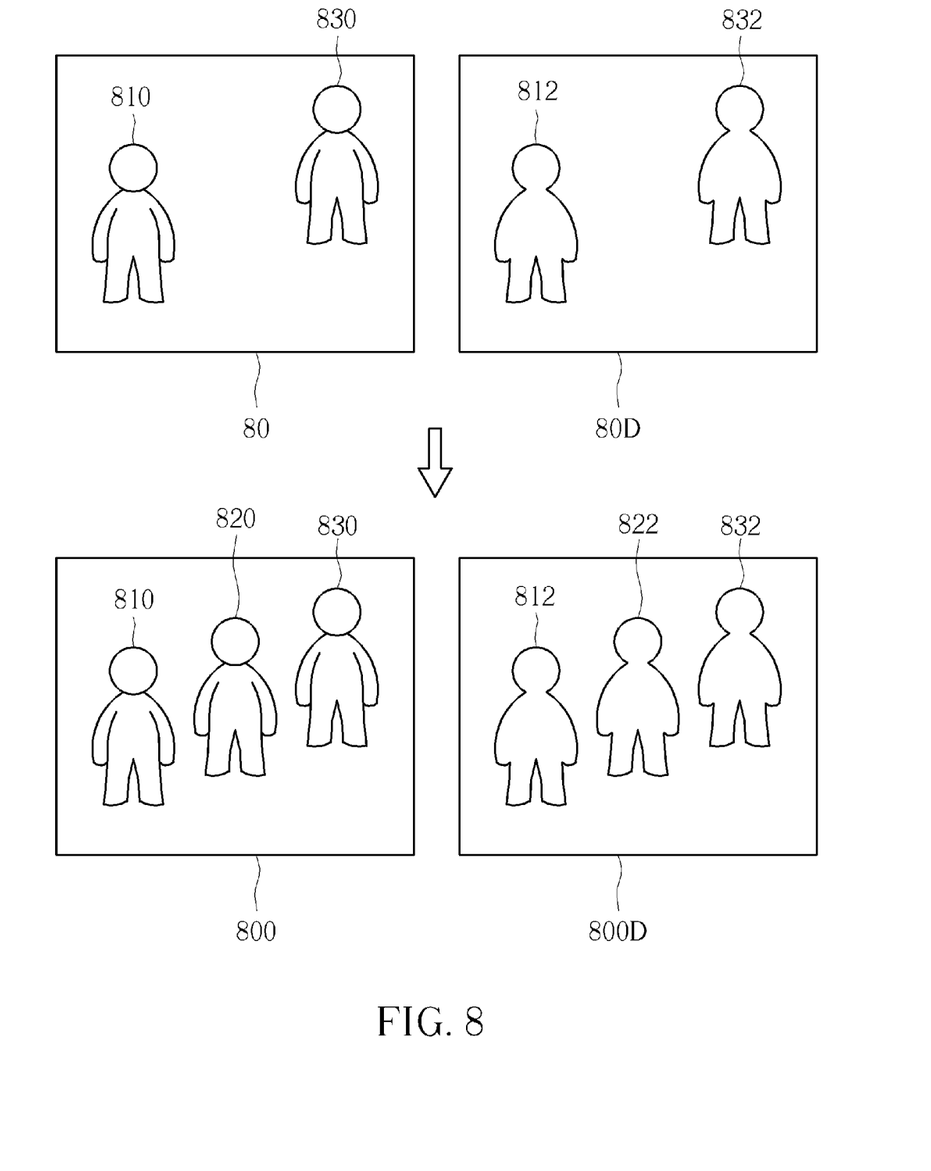
FIG. 8 illustrates new object depth information involved with the method shown in FIG. 2 according to another embodiment of the present invention.

FIG. 8 illustrates new object depth information 822 involved with the method 200 shown in FIG. 2 according to another embodiment of the present invention. The 2D image 80 and the depth map 80D can be taken as examples of the 2D image 108 and the depth map 118, respectively. In addition, the modified 2D image 800 and the modified depth map 800D can be taken as examples of the modified 2D image 112 and the modified depth map 122, respectively.

According to this embodiment, the 2D image 80 may comprise two objects 810 and 830 (e.g. two persons), and the depth map 80D may comprise the original depth information 812 and 832 respectively corresponding to the two objects 810 and 830. After the operation of Step 210 is performed, the modified 2D image 800 may comprise the original two objects 810 and 830, and may further comprise a new object 820 (e.g. another person, whose image may be cropped and copied from another image). In addition, the modified depth map 800D may comprise the original depth information 812 and 832, and may further comprise the new object depth information 822 corresponding to the new object 820.

If the depth gap between the depth layer group of the original depth information 812 (e.g. the depth distribution of the original depth information 812) and the depth layer group of the original depth information 832 (e.g. the depth distribution of the original depth information 832) along the depth axis is large enough to allow the new object depth information 822 to be inserted, the new object depth information 822 may be inserted to produce the modified depth map 800D. In one example, although the objects 810 and 830 seem not so close to each other on the 2D plane, the depth gap between the depth layer group of the original depth information 812 and the depth layer group of the original depth information 832 along the depth axis may not be large enough to allow the new object depth information 822 to be inserted. Therefore, to increase the depth gap, the depth information management module 120 may perform the aforementioned depth normalization and/or layer extension on at least one of the depth layer group of the original depth information 812 and the depth layer group of the original depth information 832 in the depth map 80D first.

Then the new object depth information 822 corresponding to the new object 820 can be inserted. For brevity, similar descriptions for this embodiment are not repeated in detail here.

Figure 9:
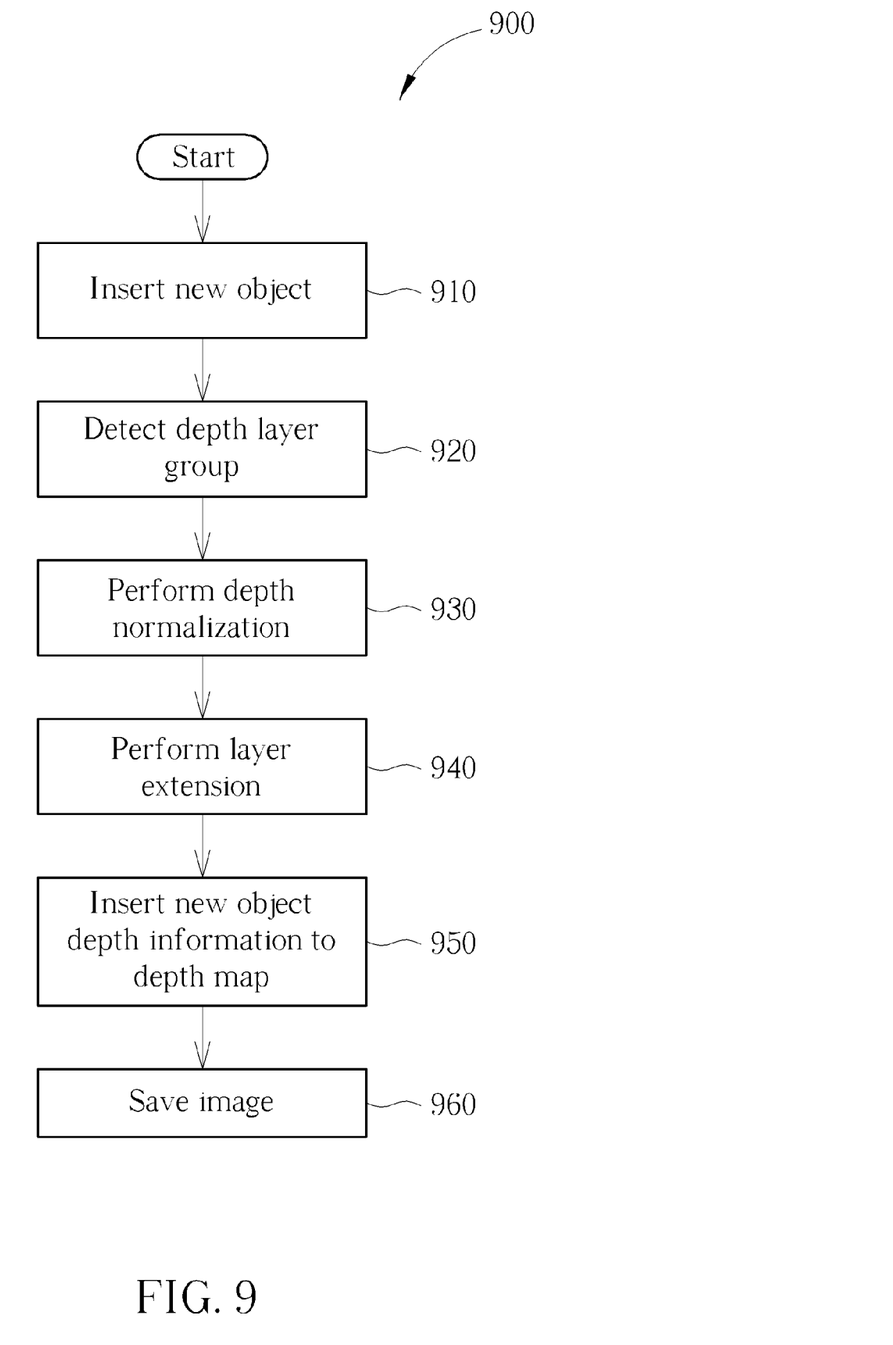
FIG. 9 illustrates a working flow involved with the method shown in FIG. 2 according to another embodiment of the present invention.

FIG. 9 illustrates a working flow 900 involved with the method 200 shown in FIG. 2 according to another embodiment of the present invention. The working flow 900 can be applied to the apparatus 100 shown in FIG. 1 and/or the architecture 300 shown in FIG. 3.

In Step 910, the processor 105 (e.g. the 2D image processing module 110 running thereon) may insert a new object in an image such as the 2D image 108 mentioned in Step 210, for generating a modified image such as the modified 2D image 112. This new object can be taken as an example of the aforementioned at least one new object in the modified 2D image 112.

In Step 920, the processor 105 (e.g. the depth information management module 120 running thereon) may detect one or more depth layer groups in the image mentioned in Step 910, such as the aforementioned depth layer group(s) in the 2D image 108.

In Step 930, the processor 105 (e.g. the depth information management module 120 running thereon) may perform the aforementioned depth normalization on one or more depth layer groups, to generate one or more normalized depth layer groups. As a result of performing the depth normalization, the depth information management module 120 may alter a set of depth data corresponding to the same depth layer group to become the same depth.

In Step 940, the processor 105 (e.g. the depth information management module 120 running thereon) may further perform the aforementioned layer extension on one or more normalized depth layer groups. As a result of performing the layer extension, the depth information management module 120 may extend the depth gap between the depth layer group and another depth layer group, or between the depth layer group and a depth layer along the depth axis, or may extend the depth gap between one depth layer and another depth layer within a depth layer group such as the specific depth layer group mentioned above, or between a depth layer of one depth layer group and a depth layer of another depth layer group along the depth axis.

In Step 950, the processor 105 (e.g. the depth information management module 120 running thereon) may insert new object depth information (i.e. the depth information of this new object) to the depth map of the image mentioned in Step 910, to generate the modified depth map 122. For example, the processor 105 may prepare the file header of the modified image, and may save the modified depth map 122 into this file header.

In Step 960, the processor 105 may save the modified image, together with the file header thereof, into a file (labeled "Save image" in FIG. 9, for brevity). This file can be taken as an example of the image file mentioned in Step 220.

It should be noted that, according to different embodiments, the working flow 900 may be performed in an order different from the order shown in FIG. 9, one or more steps may be added to the working flow 900, and/or one or more steps may be omitted from the working flow 900. For example, in different embodiments, Step 940 can be performed before Step 930, and Steps 920-940 can be omitted.

Figure 10:
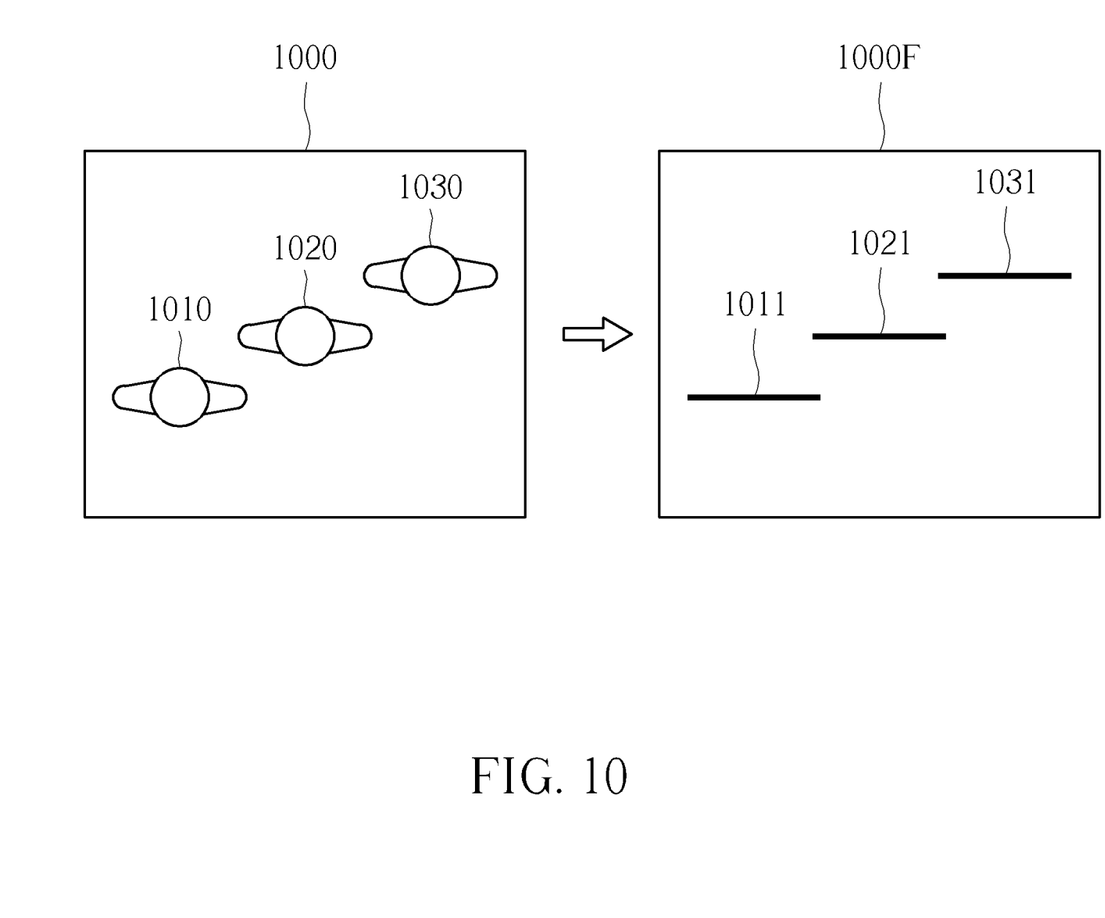
FIG. 10 illustrates some imaginary objects regarding depth normalization involved with the method shown in FIG. 2 according to an embodiment of the present invention.

FIG. 10 illustrates some imaginary objects 1011, 1021, and 1031 regarding the depth normalization involved with the method 200 shown in FIG. 2 according to an embodiment of the present invention. For example, there may be three objects 1010, 1020, and 1030 (e.g. three persons, seen from above) in the real space 1000. During the depth normalization, the depth information management module 120 may alter a set of depth data of the object 1010 to become the same depth such as a first depth value, which means a first set of pixels representing the object 1010 on the modified 2D image 112 corresponds to the first depth value. In addition, during the depth normalization, the depth information management module 120 may alter a set of depth data of the object 1020 to become the same depth such as a second depth value, which means a second set of pixels representing the object 1020 on the modified 2D image 112 corresponds to the first depth value. Additionally, during the depth normalization, the depth information management module 120 may alter a set of depth data of the object 1030 to become the same depth such as a third depth value, which means a third set of pixels representing the object 1030 on the modified 2D image 112 corresponds to the third depth value. As a result of performing the depth normalization, the depth information management module 120 may convert the three objects 1010, 1020, and 1030 into the imaginary objects 1011, 1021, and 1031 which seem to have been flattened (e.g. three "flattened" persons, seen from above) in the normalized space 1000F.

According to this embodiment, the depth information management module 120 may perform the depth normalization to make (or to increase) a depth gap between any two depth layer groups within the three depth layer groups respectively corresponding to the three objects 1010, 1020, and 1030. For brevity, similar descriptions for this embodiment are not repeated in detail here.

As mentioned in the embodiment shown in FIG. 3, the apparatus 100 may utilize the depth sensor 320 to generate the depth information of the depth map 118. This is for illustrative purposes only, and is not meant to be a limitation of the present invention. According to some embodiments of the present invention, the apparatus 100 may utilize two cameras, rather than utilizing the depth sensor 320 shown in FIG. 3, to generate the depth information of the depth map 118. More particularly, the apparatus 100 may utilize the two cameras to take a set of photos and perform some calculations according to the set of photos to generate the depth information of the depth map 118. For example, these calculations may be performed based upon some parameters regarding the spatial relationships between a tiny (or small) object in the real space and the two cameras. Examples of the parameters may include, but not limited to, the distance between the two cameras. In a situation where the background is kept the same on the set of photos, the locations of this tiny object on the set of photos are typically different. As a result of determining in these calculations the shape of the triangle having its three vertices at this tiny object and the two cameras, respectively, the spatial relationships between this tiny object in the real space and the two cameras can be determined. Therefore, the depth of this tiny object can be determined. Please note that the depth information of an object which is not tiny can also be determined since any portion of this object can be taken as an example of the tiny object mentioned above. In addition, a specific camera within the two cameras of these embodiments may comprise the camera sensor 330, and the apparatus 100 may utilize the specific camera to generate the image data of the 2D image 108 while obtaining associated data for calculating the depth information of the depth map 118 from the specific camera. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing depth information management in an electronic device, the method comprising the steps of:
    modifying a two-dimensional (2D) image, and selectively modifying a depth map of the 2D image based on modification of the 2D image before, when, or after the 2D image is modified, wherein the 2D image is retrieved from a storage module; and
    saving the modified depth map into an image file of the modified 2D image.

2. The method of claim 1, wherein the modified depth map and the modified 2D image correspond to each other.

3. The method of claim 1, wherein the step of selectively modifying the depth map of the 2D image based on the modification of the 2D image before, when, or after the 2D image is modified further comprises: detecting a depth layer group in the depth map according to depth information corresponding to multiple pixels of the 2D image, wherein the depth information corresponding to the multiple pixels of the 2D image is obtained from the depth map.

4. The method of claim 3, wherein the step of selectively modifying the depth map of the 2D image based on the modification of the 2D image before, when, or after the 2D image is modified further comprises: performing depth normalization on the depth layer group in the depth map.

5. The method of claim 3, wherein the step of selectively modifying the depth map of the 2D image based on the modification of the 2D image before, when, or after the 2D image is modified further comprises: performing layer extension on at least one portion of a plurality of depth layers of the depth layer group in the depth map.

6. The method of claim 1, wherein the step of selectively modifying the depth map of the 2D image based on the modification of the 2D image before, when, or after the 2D image is modified further comprises: inserting new object depth information into the depth map, to generate the modified depth map, wherein the new object depth information represents depth information of at least one new object in the modified 2D image.

7. The method of claim 6, wherein the step of selectively modifying the depth map of the 2D image based on the modification of the 2D image before, when, or after the 2D image is modified further comprises:
    detecting a depth layer group in the depth map according to depth information corresponding to multiple pixels of the 2D image, wherein the depth information corresponding to the multiple pixels of the 2D image is obtained from the depth map; and
    performing layer extension on at least one portion of a plurality of depth layers of the depth layer group in the depth map.

8. The method of claim 7, wherein the step of selectively modifying the depth map of the 2D image based on the modification of the 2D image before, when, or after the 2D image is modified further comprises: performing depth normalization on the depth layer group in the depth map.

9. The method of claim 6, wherein the step of selectively modifying the depth map of the 2D image based on the modification of the 2D image before, when, or after the 2D image is modified further comprises:
    detecting a depth layer group in the depth map according to depth information corresponding to multiple pixels of the 2D image, wherein the depth information corresponding to the multiple pixels of the 2D image is obtained from the depth map; and
    performing depth normalization on the depth layer group in the depth map.

10. The method of claim 6, further comprising: inserting the at least one new object into the 2D image to generate the modified 2D image.

11. An apparatus for performing depth information management in an electronic device, the apparatus comprising at least one portion of the electronic device, the apparatus comprising:
    a processor, wherein the processor comprises:
        an image processing module, arranged for modifying a two-dimensional (2D) image, wherein the 2D image is retrieved from a storage module; and
        a depth information management module, arranged for selectively modifying a depth map of the 2D image based on modification of the 2D image before, when, or after the 2D image is modified, wherein the processor saves the modified depth map into an image file of the modified 2D image.

12. The apparatus of claim 11, wherein the modified depth map and the modified 2D image correspond to each other.

13. The apparatus of claim 11, wherein the depth information management module detects a depth layer group in the depth map according to depth information corresponding to multiple pixels of the 2D image, wherein the depth information corresponding to the multiple pixels of the 2D image is obtained from the depth map.

14. The apparatus of claim 13, wherein the depth information management module performs depth normalization on the depth layer group in the depth map.

15. The apparatus of claim 13, wherein the depth information management module performs layer extension on at least one portion of a plurality of depth layers of the depth layer group in the depth map.

16. The apparatus of claim 11, wherein the depth information management module inserts new object depth information into the depth map, to generate the modified depth map, wherein the new object depth information represents depth information of at least one new object in the modified 2D image.

17. The apparatus of claim 16, wherein the depth information management module detects a depth layer group in the depth map according to depth information corresponding to multiple pixels of the 2D image, and performs layer extension on at least one portion of a plurality of depth layers of the depth layer group in the depth map, wherein the depth information corresponding to the multiple pixels of the 2D image is obtained from the depth map.

18. The apparatus of claim 17, wherein the depth information management module 2D performs depth normalization on the depth layer group in the depth map.

19. The apparatus of claim 16, wherein the depth information management module detects a depth layer group in the depth map according to depth information corresponding to multiple pixels of the 2D image, and performs depth normalization on the depth layer group in the depth map, wherein the depth information corresponding to the multiple pixels of the 2D image is obtained from the depth map.

20. The apparatus of claim 11, further comprising:
    a camera sensor, coupled to the processor, arranged for generating image data of the 2D image, wherein the processor stores the image data of the 2D image in the storage module; and a depth sensor, coupled to the processor, arranged for generating depth information of the depth map when the camera sensor generates the image data of the 2D image.

* * * * *